Oct. 30, 1928.
J. F. BROWN
1,689,618
SAW
Filed July 22, 1927
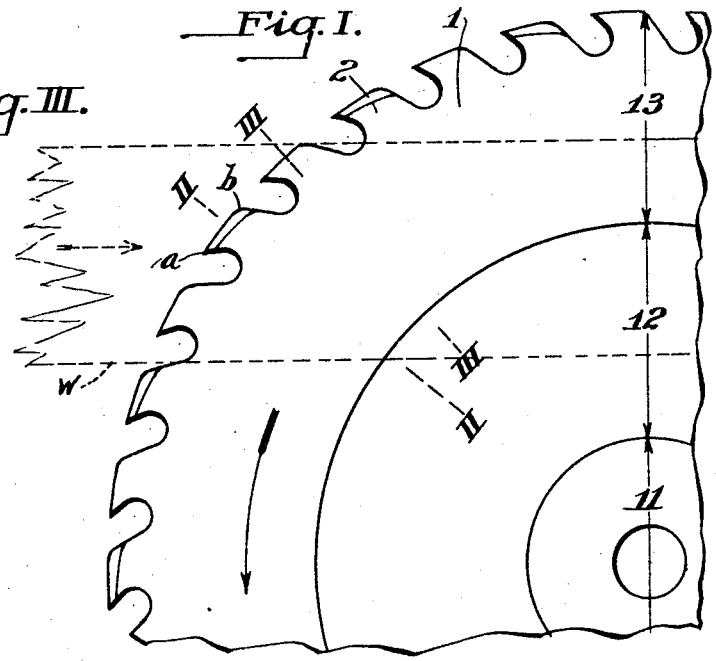
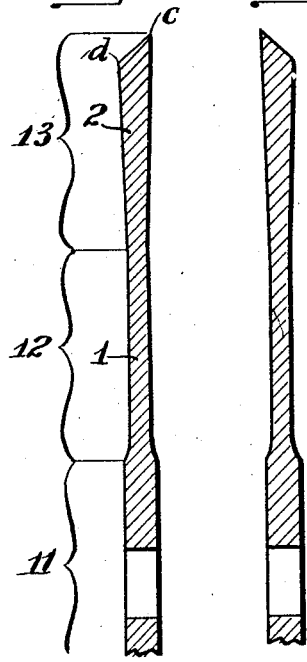
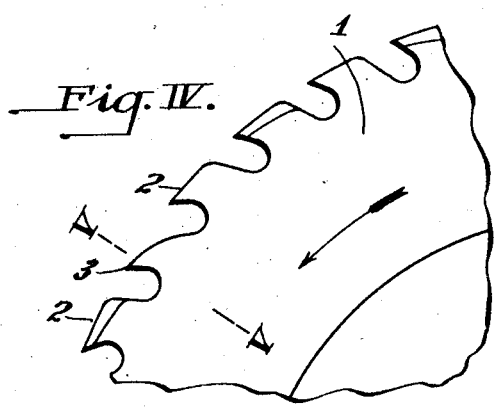
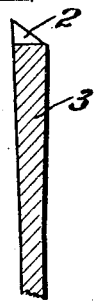
INVENTOR
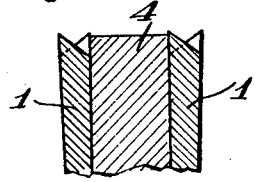

Patented Oct. 30, 1928.

1,689,618

UNITED STATES PATENT OFFICE.

JAMES F. BROWN, OF SHALER TOWNSHIP, ALLEGHENY COUNTY, PENNSYLVANIA.

SAW.

Application filed July 22, 1927. Serial No. 207,613.

My invention relates to saws and is in the application to be described embodied in a circular wood-cutting saw. It consists in improvements in the shape of the teeth of the saw. The objects in view are smoothness of cut and reduction of waste in the material cut and reduction of the attention and labor required to keep the saw dressed and in serviceable condition.

A saw embodying my invention is illustrated in the accompanying drawings. Fig. I is a view of the saw in side elevation, and in this view the direction of saw rotation is indicated by an arrow. Also, in dotted lines the position of a piece of wood and the direction of advance are indicated. Figs. II and III are views in radial section, on the planes indicated at II—II and III—III, Fig. I. In Figs. II and III the thickness of the saw is for purposes of illustration exaggerated. Fig. IV is a view corresponding to Fig. I and illustrating a modification of the structure in detail. Fig. V is a view in section on the plane indicated at V—V, Fig. IV. In this view also the thickness of the saw is exaggerated. Fig. VI is a diagrammatic view in cross-section and illustrates the adaptation of the invention to a saw structure used for making gaining cuts.

The saw body 1 of usual circular form is provided peripherally with teeth 2.

My invention lies in the shape of the teeth of the saw. The three characteristic features of my saw tooth are, first, that the edge of the tooth is prolonged circumferentially, as is indicated at a—b, Fig. I, second, that the face of the tooth is perpendicular to the plane of the cut; third, that each tooth along its circumferentially extending edge is beveled transversely, as is indicated at c—d, Fig. II, and, fourth, that successive teeth are oppositely beveled, as will be manifest on comparing Figs. II and III. The teeth having the configuration described are preferably formed upon a hollow-ground body or blank; that is to say, a blank having that cross-sectional configuration which is shown in exaggeration in Figs. II and III. The blank of relatively small thickness toward the center, toward the periphery is of relatively great thickness; it increases gradually in thickness outwardly to the edge. At the center, however, and in that portion which in operation does not enter the kerf, the body of the saw may for purposes of strength and rigidity be of increased thickness. For example, a circular saw ten inches in diameter may in the central region 11 be of 15 gauge; in the intermediate region 12 it may be of 17 gauge; and from the region 12 outwardly through the marginal region 13 it may increase in thickness to 14 gauge. The teeth in such a saw may be five sixteenths of an inch deep, seven sixteenths long from $a$ to $b$, Fig. I, and a quarter of an inch apart, measured from the point $b$ of one tooth to the point $a$ of the next succeeding tooth. These dimensions, it will be understood, are given by way of example merely.

In minute shaping, that is to say in the dressing of the tooth with a file, the edge of the tooth at the lower side of the bevel, the edge indicated at $d$, Fig. II, is preferably eased off somewhat from front to rear; that is to say the radius along the edge $d$ decreases by a minute amount from front to rear. Such slight easing off makes for ease and effectiveness in operation.

For cross-cut work it suffices to have the succession of alternately beveled teeth, as illustrated in Figs. I–III; but for ripping it is desirable to interpose between successive teeth 2, square-edged rake teeth 3. This is a feature known to the industry; it is illustrated in Figs. IV and V; and further description is unnecessary. The rake tooth 3 will as usual be prolonged to a radius somewhat less than that of the cutting teeth 2. The rake teeth may be interposed in every interval between cutting teeth, but ordinarily they preferably will be interposed in every fourth or fifth interval.

In Fig. VI I have diagrammatically indicated a compound saw structure used for making gaining cuts. This compound structure includes two saw parts 1 and 1, such as I have described, and, interposed between these, a saw part 4 with square ended teeth such as the rake teeth 3 of Fig. V. The teeth of saw part 4 will extend to a perimeter slightly less than that of saw parts 1, 1. The saw parts 1 may in such an assembly be one sixteenth of an inch thick at the edge, and the saw part 4 one quarter of an inch thick. The gaining cut will then be approximately three eighths of an inch wide. The figures are given by way of example merely.

In the practice of my invention I have found that my saw makes a smoother cut. Accordingly, there is less waste of material in the subsequent finishing of the sawn surface. The operation is performed with relative ease, with relatively small expenditure of power. The saw teeth continue for relatively long time in effective condition, and require a minimum amount of attention and dressing, and consequently there is greater efficiency and less delay in use.

I claim as my invention:

A saw provided with teeth whose front faces are perpendicular to the plane of cut and whose top edges, prolonged in the line of travel, are beveled transversely, the angle of bevel being greater at the forward than at the rear end of the tooth.

In testimony whereof I have hereunto set my hand.

JAMES F. BROWN.